United States Patent [19]

Kral

[11] Patent Number: 4,601,776

[45] Date of Patent: Jul. 22, 1986

[54] CARPET TAPE STRIPPER

[76] Inventor: Vaclav Kral, 1617 S. Beretania 1001, Honolulu, Hi. 96826

[21] Appl. No.: 708,048

[22] Filed: Mar. 4, 1985

[51] Int. Cl.[4] .................................... B32B 31/18

[52] U.S. Cl. .................................... 156/584; 30/172; 156/344

[58] Field of Search .................... 30/169, 172; 156/344, 156/584

[56] References Cited

U.S. PATENT DOCUMENTS

| | | | |
|---|---|---|---|
| 1,665,766 | 4/1928 | Binger | 30/172 |
| 2,236,093 | 3/1941 | Friend | 30/172 |
| 4,502,223 | 3/1985 | Brookfield | 30/172 X |

*Primary Examiner*—Robert A. Dawson

[57] ABSTRACT

This invention is a carpet tape stripper that includes a scraper made of toothed blades, pivot means for the scraper and a handle for holding the tool in use.

1 Claim, 5 Drawing Figures

CARPET TAPE STRIPPER

This invention relates generally to hand tools. More specifically it relates to tools used for stripping tape.

It is well known to those persons, such as building maintenance men and others who work with carpet tape, that it is really difficult to strip covering paper from the tape by using the fingernails. This situation is accordingly, in need of an improvement.

Therefore, it is a principal object of the present invention to provide a carpet tape stripper tool which quickly and easily strips the covering paper off the tape so as to expose the tape pressure sensitive adhesive surface.

Another object, accordingly, is to provide a carpet tape stripper which saves time in trying to strip off the covering paper and also saves wear and tear on a person's fingernails.

Yet, another object is to provide a carpet tape stripper which is a small tool that conveniently fits in a workman's pocket so to be readily handy when needed on a job.

Other objects are to provide a carpet tape stripper, which is simple in design, inexpensive to manufacture, rugged in construction, easy to use, and efficient in operation.

These, and other objects, will be readily evident, upon a study of the following specification, and the accompanying drawing, wherein.

Figure 1:
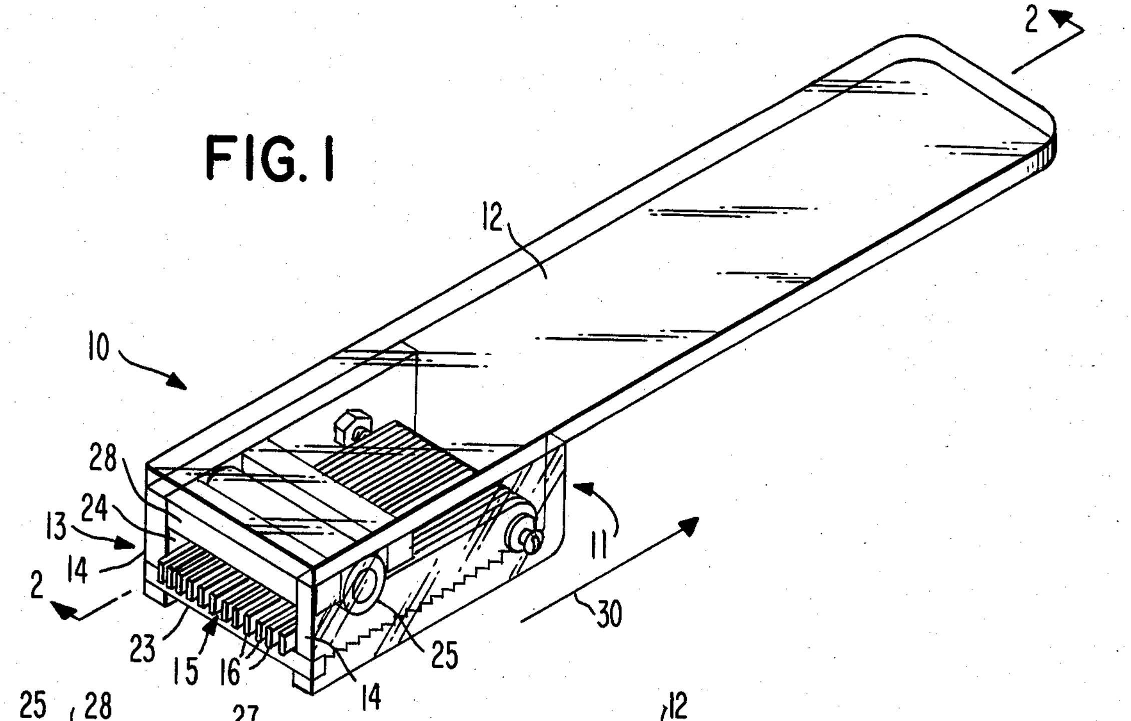
FIG. 1 is a perspective view of carpet tape stripper shown in accordance with the present invention.
Figure 2:
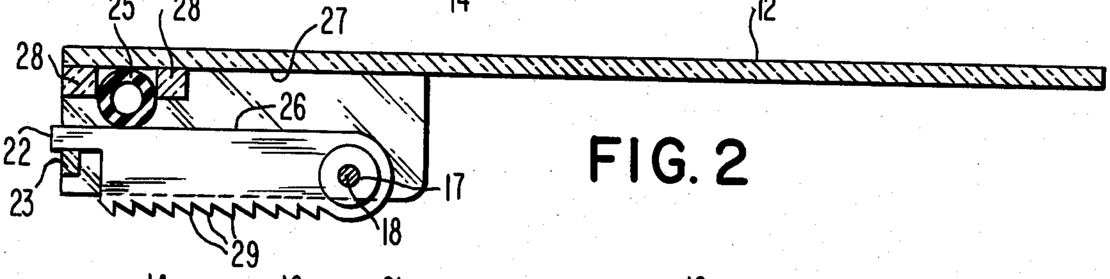
FIG. 2 is a cross-sectional view taken along line 2—2 of FIG 1.
Figure 3:
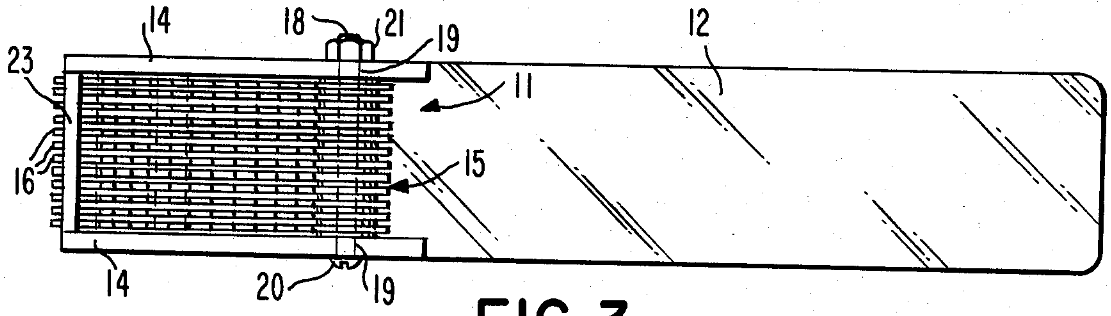
FIG. 3 is a bottom plan view of the embodiment of the invention.

Referring now to the drawing in greater detail, and more particularly to FIGS. 1 to 3 thereof at this time, the reference numeral 10 represents a carpet tape stripper according to the present invention, wherein there is a working head 11 at one end of a handle 12. The head includes an inverted, "U"-shaped frame 13 formed on an underside of the handle by means of two, parallel, spaced apart, side walls 14 between which a scraper 15 is pivotally supported. The scraper is formed of a plurality of blades 16 in spaced apart position alongside each other; each blade having an oversized opening 17 near one end so as to fit pivotally free on a bolt 18 that extends between the side walls 14 and is supported in openings 19 thereof. The bolt has an enlarged head 20 at one end and is fitted with a nut 21 at its other end. The opposite ends of the blades have narrow extensions 22 for abutting against a stop 23 that limits the pivotable movements of the blades. The stop comprises a bar extending transversely across the gap 24 containing the scraper and is rigidly affixed at each end to the two side walls 14. A flexible rubber hose 25 is located between the upper edges 26 of the blades and an underside face 27 of the handle so as to serve as a spring that urges the opposite ends of the blades to pivot against the stop. The hose is positioned transversely across the gap and is retained there by means of a bar 28 along opposite sides thereof and which are affixed to the underside face 27. A bottom edge of the blades protrude downward lower than a bottom edge of the side walls 14, and the lower edge of each blade is made having a row of sharpened teeth 29.

In operative use, the tool working head is places against the tape covering and the tool handle is then tilted slightly upwardly so that the blade ends located directly under the hose can scrape against the tape cover. The hose serves as a spring so that each blade bears down individually so as to accommodate any uneveness of a floor surface. As shown in FIG. 2, the teeth 29 are angled like those of a hack saw so as to grip the tape cover when the tool is moved in direction 30.

Figure 4:
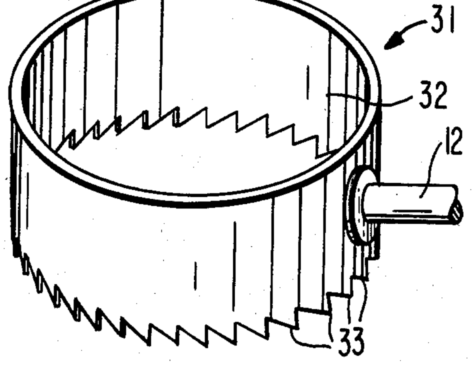
FIG. 4 is a second embodiment of the preferred FIG. 1 embodiment, with the handle broken away.

FIG. 4 shows a modified design of tool working head 31 comprising a rigid, circular blade 32 and sharpened teeth 33 on one edge.

Figure 5:
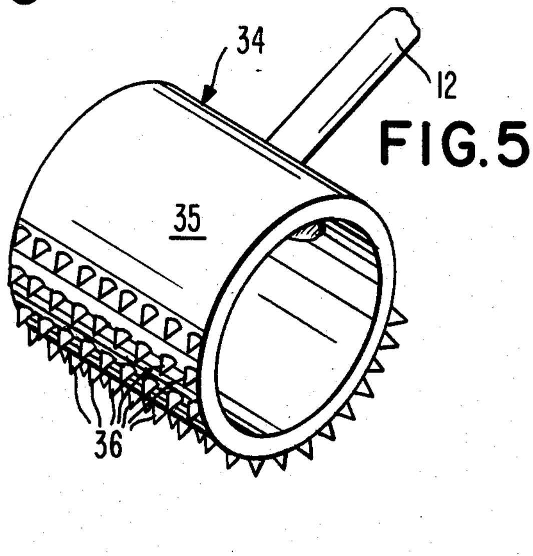
FIG. 5 is a third embodiment of the preferred FIG. 1 embodiment, with the handle broken away.

FIG. 5 shows another design of working head 34 made of a rigid cylinder 35 having teeth 36 on its outer side.

While various changes may be made in the detail construction, it is understood that such changes will be within the spirit and scope of the present invention, as is defined by the appended claims.

What I now claim is:

1. A carpet tape stripper, comprising, in combination, an elongated hand and a working head on one end of said handle, said working head comprising an inverted, "U"-shaped frame on an underside of said handle, said frame including a pair of parallel, spaced apart side walls, and a scraper pivotally supported between said side walls; said scraper comprising a plurality of flat blades in parallel, spaced apart position alongside each other, a transverse extending bolt secured between said side walls, one end of each said blade having an opening freely receiving said bolt therethrough, a narrow extension upon an opposite end of each said blade, a transverse extending bar affixed between said side walls, each said blade extension resting upon said bar, a transverse extending, flexible, rubber hose bearing between an upper edge of said blades and an underside of a bridging central portion of said frame, and a row of ratchet-type teeth along a lower edge of each said blade.

* * * * *